United States Patent
Kumakura

(10) Patent No.: US 6,301,343 B1
(45) Date of Patent: Oct. 9, 2001

(54) TRUNK LINE EXCHANGE SYSTEM

(75) Inventor: Hiroshi Kumakura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/130,481

(22) Filed: Aug. 7, 1998

(30) Foreign Application Priority Data

Aug. 18, 1997 (JP) .................................................. 9-221610

(51) Int. Cl.[7] .................................................. H04M 15/00
(52) U.S. Cl. ........................ 379/133; 379/137; 379/220.01
(58) Field of Search ................................... 379/133, 137, 379/139, 111, 220

(56) References Cited

U.S. PATENT DOCUMENTS

| | | | | |
|---|---|---|---|---|
| 4,456,788 | * | 6/1984 | Kline et al. | 379/137 |
| 5,359,649 | * | 10/1994 | Rosu et al. | 379/113 X |
| 5,459,777 | * | 10/1995 | Bassa et al. | 379/133 |
| 5,825,861 | * | 10/1998 | Hoy | 379/133 |
| 5,974,126 | * | 10/1999 | Hollas et al. | 379/133 X |
| 6,084,955 | * | 7/2000 | Key et al. | 379/133 |

FOREIGN PATENT DOCUMENTS 61-287364   12/1986   (JP) .

OTHER PUBLICATIONS

Japanese Office Action, dated Jan. 25, 2000, with English language translation of Japanese Examiner's comments.

* cited by examiner

*Primary Examiner*—Creighton Smith
(74) *Attorney, Agent, or Firm*—McGuireWoods, LLP

(57) ABSTRACT

The present trunk line exchange system is capable of coping with the busy hour calls without falling into congestion by executing re-distribution of the number of communication lines to the busy region from the quite region, which results in yielding efficient utilization of the communication lines. The system is also capable of avoiding the congestion of the exchange system, since it is not necessary to conduct a series of operations such as recalls/alternative line processing.

4 Claims, 4 Drawing Sheets

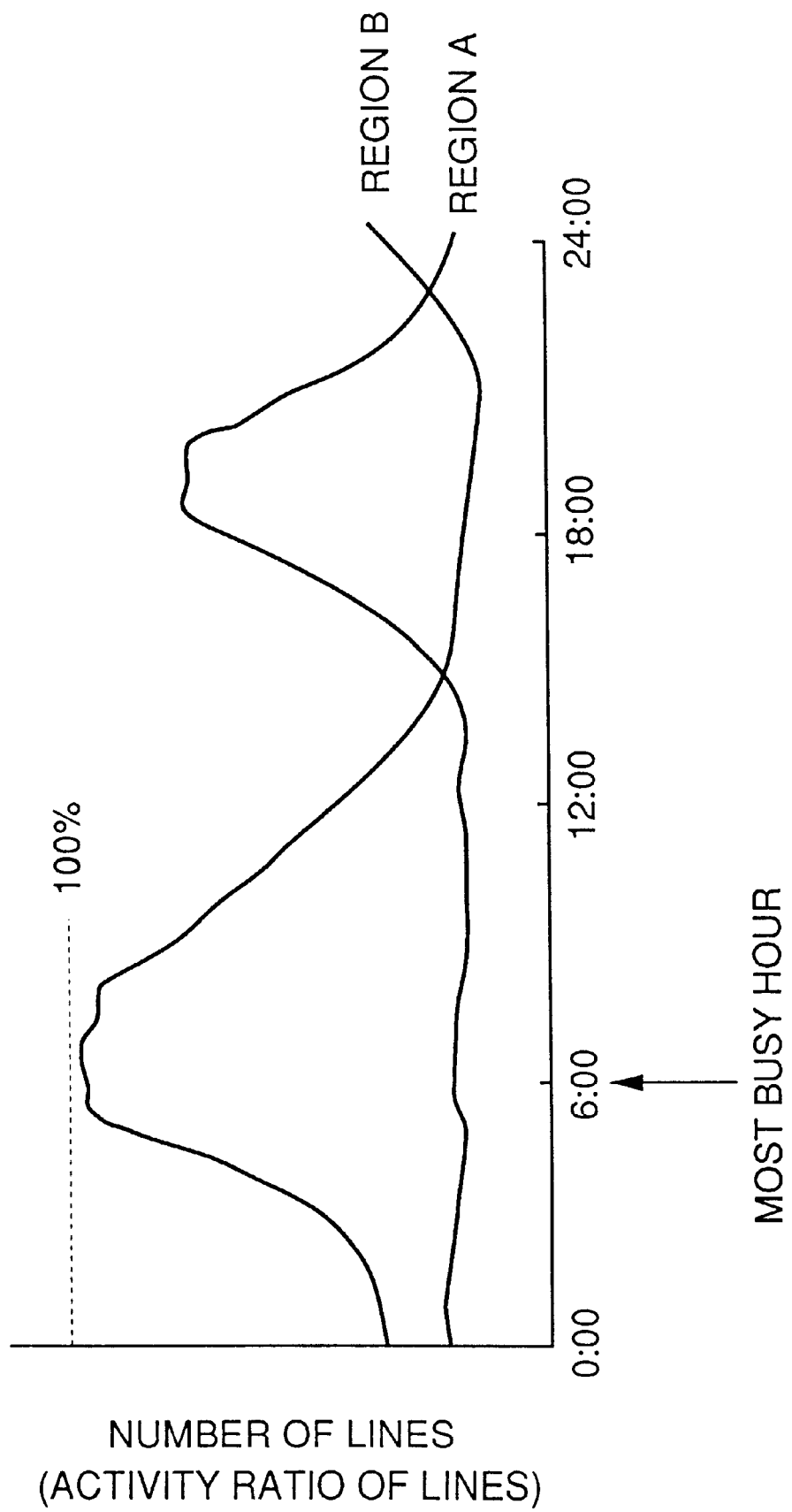

TRUNK LINE EXCHANGE SYSTEM

BACKGROUND OF THE INVENTION

1. Field of the Invention

This invention relates to a trunk line exchange system in an international communication network, and particularly relates to a trunk line exchange system capable of executing re-distribution of the number of international transmission lines for respective regions in the international communication network.

This application is based on Patent Application No. Hei 9-221610 filed in Japan, the content of which is incorporated herein by reference.

2. Background Art

Conventionally, in the international network which conducts the international exchange of the trunk lines, a fixed number of transmission lines are distributed so as to meet demand in each country (which is called a "region", hereinafter). The number of transmission lines for a region is determined by calculating a ratio of average traffic to busy hour traffic for each region and a fixed number of communication lines are normally allocated for each region. Moreover, the number of transmission lines for each region is normally includes spare lines in order to preserve efficient call connections even during busy hours.

In addition to the above line-allocation, another measure for busy hours has been provided in the conventional system, in which, an alternative or detour route is registered in advance in an international trunk line exchange apparatus, and, when the traffic density to a region exceeds 100% causing a congested condition, the trunk switching is executed for the region through the alternative route using a trunk line exchange apparatus located in a third region. An example of such measure is disclosed in Japanese Patent Application, First Publication No. 7-221833.

In the above described conventional trunk line exchange system, there are some drawbacks, in addition to the costly spare lines for preventing deterioration of call connections in a congested condition, in that, as shown in FIG. 4, even if an activity ratio of a trunk line for a busy region is nearly 100%, lines in another region are inactive due to the time difference, which results in reducing the average employment efficiency of trunk lines in the whole trunk line exchange system, which may be designated a transmission resource.

When an alternative route is used during congested hours, since it is necessary to carry out a series of operations of recalling and searching the alternative route, that is, operations of calling and recalling to acquire a line to the destination and, if line is busy, operations are required to search and acquire an alternative line, the processing of the trunk line exchange system is increased which sometimes exceeds a capacity of the system or renders the system more restricted by addition of the processing to the normal processing during a busy period.

It is, therefore, the object of the present invention to provide a system capable of enabling the efficient utilization of the transmission resource and capable also of avoiding an exchange apparatus at any region from falling into congestion.

SUMMARY OF THE INVENTION

In order to attain the object of the present invention, the first embodiment of the present invention provides a line switching unit comprising line switching units disposed at a front position of a trunk line exchange apparatus facing toward the other trunk line exchange apparatus, wherein the number of transmission lines toward one region is increased or decreased by executing re-distribution of transmission lines to cope with the variation of the traffic conditions at the region by controlling opening and closing of said line switching units.

The second embodiment of the present invention provides a trunk line exchanging system which is modified from the first embodiment, wherein the system comprising:

region traffic managing means for managing the traffic of each region;

trunk line exchange means installed at each region for executing international trunk line exchange; and interface means connected with both said trunk line switching means and said traffic managing means for receiving signals of at least one of the activity ratio at each region, and for sending signals to instruct closing of lines and switching of lines to both said region traffic managing means and with said trunk line exchange means, wherein the optimum number of lines to be allocated for each region is re-distributed based on the activity ratio of each region.

In the above second embodiment, said traffic managing means comprising:

a line switching means for switching each unit of transmission lines;

an interface means for receiving information in terms of the activity ratio of each region, exchanging control signals with the other interface means and the other traffic managing means for switching the transmission lines from a region to the other region, and, when the switching is pertinent, controlling line switch means to execute re-distribution.

According to the present invention, line switch means are disposed at a front position of a trunk line exchange apparatus facing toward the other trunk line exchange apparatus, and by controlling opening and closing of the line switch means, the number of lines for each region can be re-distributed in response to the traffic of each region and the system can be preferably prevented from falling into congestion.

BRIEF DESCRIPTION OF DRAWINGS

FIG. 4 shows a variation of activity ratios at two regions in a conventional system.

DETAILED DESCRIPTION OF EMBODIMENTS

Preferable embodiments of the present invention are described hereinafter referring to drawings.

A. First Embodiment (1) Construction

Figure 1:
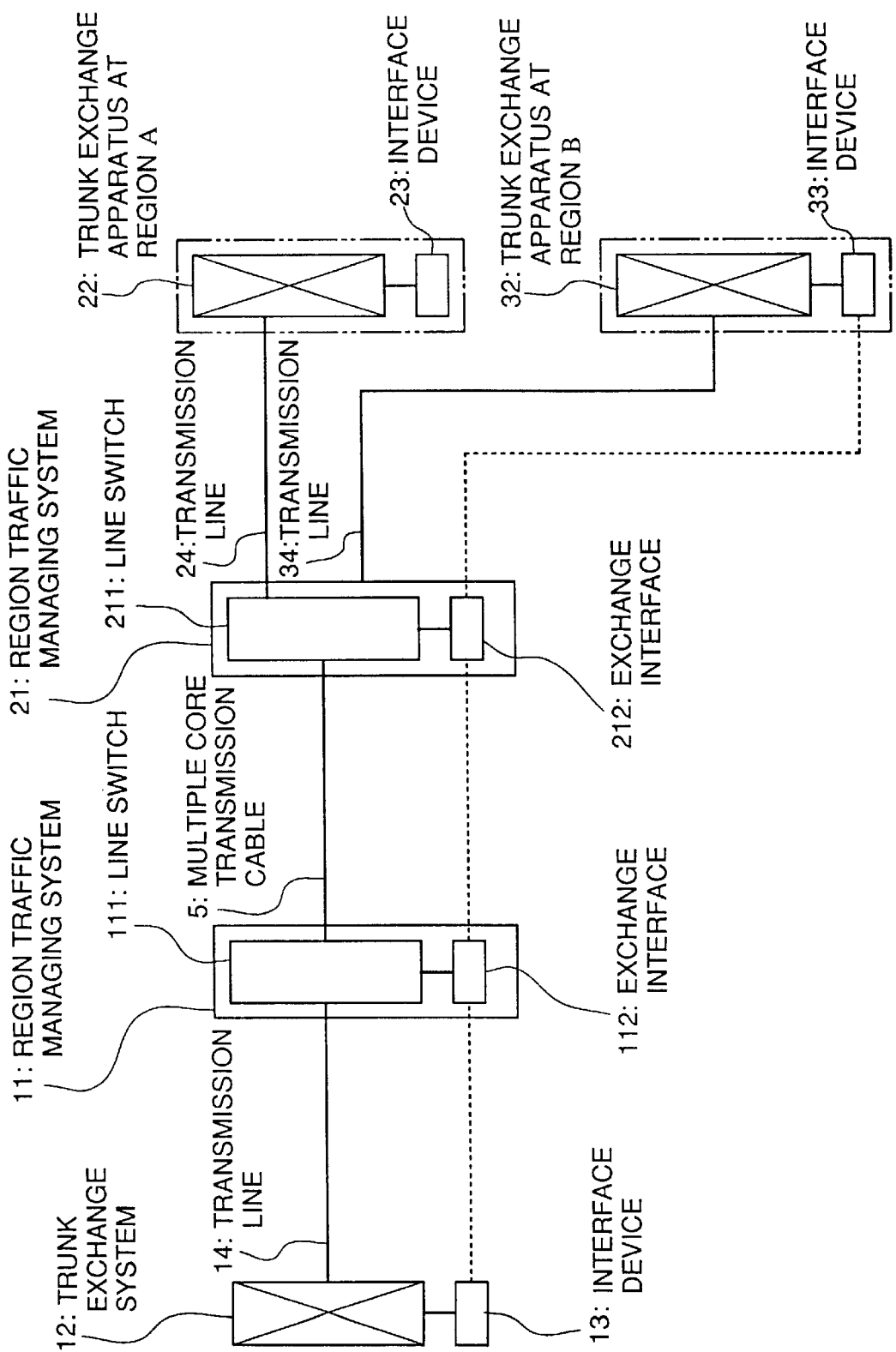
FIG. 1 shows a construction of the trunk line exchange apparatus system according to the first embodiment of the present invention.

FIG. 1 is a block diagram showing a schematic construction of the trunk line exchange apparatus system according to the first embodiment of the present invention. As shown in the figure, a trunk line exchange system of the present invention comprises:

region traffic managing systems 11 and 21 for executing re-distribution of transmission lines for each region for an effective utilization of the system resource;

trunk line exchange apparatuses 12, 22, and 32 located at respective regions for conducting international trunk line exchange;

interface units 13, 23, 33, 112, and 212 connected with both said trunk line exchange apparatuses 12, 22, 32 and said region traffic managing system 11 and 21, for exchanging control signals relating to information as to line activity ratios, line closing, and line switching etc.;

a plurality of transmission lines 14, 24 and 34 for connecting between the trunk line exchange apparatuses 12, 22, and 32 and the region traffic managing system 11 and 21, respectively; and a multiple core transmission cable 5 for connecting each region.

In order to execute re-distribution of lines, the region traffic control systems 11 and 21 are provided with the interface units 112 and 212 for conducting the following processing. That is, the region traffic control systems 11 and 21 receive information regarding the activity ratios of respective trunk line exchange apparatuses 12, 22 and 32 through line switching units 111 and 211 for switching respective transmission lines and interface units 13, 23, and 33; and send and receive signals for controlling switching with the above interface units 13, 23 and 33 and the region traffic managing systems 11 and 21 each connected to respective interface units, and control connections of line switching units 111 and 211, if it is decided that the line switching is pertinent.

(2) Operation

In the trunk line exchange apparatus system according to the above construction, the re-distribution of transmission lines is executed by the following three steps based on information from the region traffic managing systems in order to raise the efficiency of the whole system.

① The First Step

At this step, assume that the trunk line exchange apparatus 12 controls operations of a plurality of transmission lines toward the region A and toward the region B by making use of the line 14. The trunk line exchange apparatus 12 is connected to trunk line exchange apparatuses 22 and 32 through a line switching unit 111 of the region traffic managing system 11, a multiple core transmission cable 5, and a line switch 211 of the region traffic managing system 11.

② The Second Step

At this step, the interface unit 112 of the exchange apparatus monitors through the interface unit 13 activity ratios in the respective regions which are under control of the interface unit 112. Now, assume that the activity ratio of a specified region (for example, region B) increases and the activity ratio of the other region (for example, region A) is low. In this case, the interface unit 112 generates a request signal to switch some of the lines bound for the region A involved in the transmission line 14 into lines bound for the region B, and the interface 112 also generates and send a signal to switch some of the lines from the region A to the region B to the exchange apparatus 12 through the interface unit 13 as well as to the interface unit 212 of the region traffic managing system 21 which controls the exchange apparatus 22 and 32 for respective regions A and B.

Subsequently, the region traffic managing system 21 performs judgement whether or not the re-distribution is pertinent. If the judgement is that it is pertinent, then the interface unit 212 of the region traffic managing system 21 sends a signal to close said part of the lines of the transmission lines 24 to the trunk line exchange apparatus 22 through the interface unit 23 of the region A, and at the same time, the interface unit 212 sends a signal to open said lines in the transmission lines 34 to the trunk line exchange apparatus 32 of the region B through the interface unit 23.

③ The Third Step

When the signal from the region traffic managing system 11 is accepted, a series of switching operation is conducted; that is, some of the transmission lines 14 and 24 towards the region A is closed, the line switching units 211 are switched by means of the exchange interface unit 212, and the trunk line lines 14 and 34 towards the region B are opened.

Alternative methods to switch the transmission lines may be adopted; one method is to switch some of the lines when the activity ratio at the region exceeds a predetermined values by setting in advance a busy hour zone and which transmission lines are to be switched for each region, and, the other method is to conduct dynamic switching based on activity ratios monitored by the trunk line exchange apparatus.

B. The Second Embodiment

Figure 2:
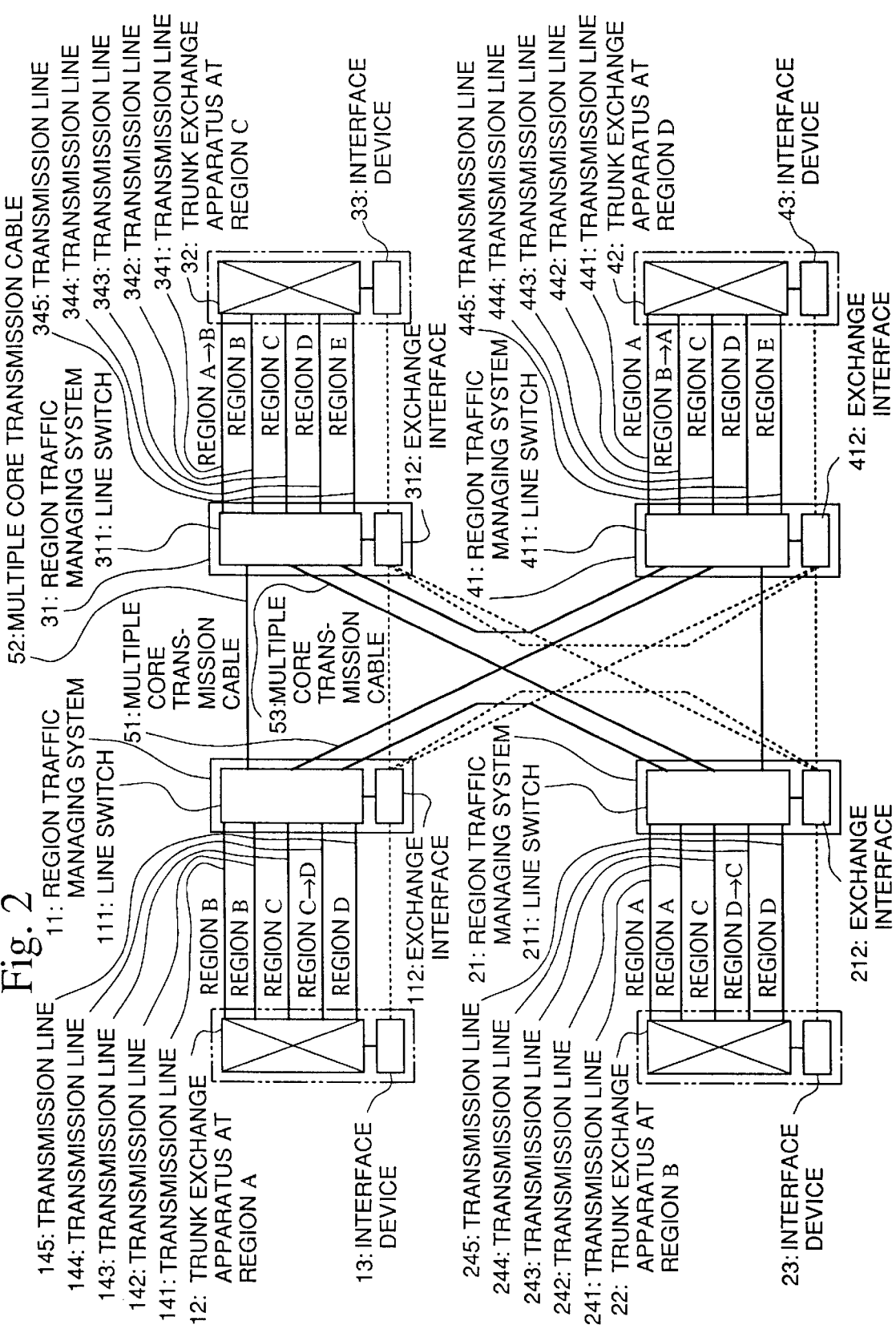
FIG. 2 shows a construction of the trunk line exchange apparatus system according to the first embodiment of the present invention.

In the above first embodiment, re-distribution is conducted for some of the transmission lines connecting each region and the multiple core transmission cable. In contrast, in the second embodiment, as shown in FIG. 2, a network is formed for managing the region traffic so as to enable execution of the re-distribution of transmission lines between different regions connected by a plurality of multiple core transmission cables 52 to 54. In this case, it is more preferable and more effective to form such networks than in the first embodiment, since the longer the distance between respective regions apart, the larger the time differences between respective regions.

(1) Construction

FIG. 2 is a block diagram showing a schematic construction of the trunk line exchange system according to the second embodiment of the present invention. As shown in this figure, the trunk line exchange system of the second embodiment comprises:

region traffic managing systems 11, 21, 31, and 41 for executing the re-distribution of the transmission lines by managing the region traffic for efficient utilization of the trunk line exchange system;

trunk line exchange apparatuses 12, 22, 32, and 42 located in respective regions for conducting international trunk line exchange;

interface units 13, 23, 33, and 43 connected with corresponding trunk line exchange apparatuses 12, 32, and 42 for exchanging control signals in terms of the activity ratio of each region, line-closing, and line-switching or the like with region traffic managing systems 11, 21, 31, and 41;

trunk lines 141–145, 241–145, 341–345, and 441–445 comprising a plurality of lines for connecting between the trunk line exchange apparatuses 12, 22, 32, and 42 and the region traffic managing systems 13, 23, 33, and 43, respectively; and multiple core transmission cables 51, 52, 53, and 54 for connecting between respective regions.

The region traffic managing systems 11, 21, 31, and 41 receive information about the activity ratios of respective regions by respective trunk line exchange apparatuses 12, 22, 32 and 42 through line switching units 111, 211, 311, 411 and the exchange interface units 112, 212, 312, and 412, respectively. In order to execute effective re-distribution of the transmission lines, the trunk line exchange apparatuses 12, 22, 32, and 42 exchange signals each other to determine whether or not the re-distribution is pertinent with the region traffic managing systems 11, 21, 31, and 41 and the exchange interface units 112, 212, 312, and 412, and when it is decided that the re-distribution is pertinent, the exchange interface units 112, 212, 312, and 412 instruct re-distribution of the transmission lines by controlling the line switching units 111, 211, 311, and 411.

(2) Operation

According to the trunk line exchange system possessing the above construction, the re-distribution of the transmission lines is executed by three steps shown below in order to realize efficient utilization of the network.

① The First Step

Assume that the trunk line exchange apparatus 12 of the region A controls operations of the region B by means of trunk lines 141 and 142 comprising a plurality of transmission lines; controls operations of the region C by means of trunk lines 143 and 144 comprising a plurality of transmission lines, and controls operations of the region D by means of a trunk line 145 comprising a plurality of transmission lines. The trunk lines 141 and 142 connect the trunk line exchange apparatus 12 of the region A with the trunk line exchange apparatus 22 of the region B through trunk lines 241 and 242 via the line switching unit 111 of the region traffic managing system 11, the multiple core transmission cables 53, and the line switching unit 211. Similarly, the trunk lines 143, 144, and 145 link the trunk exchange apparatus 12 of the region A with the trunk exchange apparatus 32 of the region C and the trunk line exchange apparatus 42 of the region D through trunk lines 341, 342, and 441 by way of the line switching unit 111 of the region traffic managing system 11, the multiple core transmission cables 52 and 51, and line switching units 311 and 411.

② The Second Step

The region traffic managing system 11 always monitors the activity ratios for respective regions of the following trunk line exchange apparatus 12. In the case when the activity ratio for a specified region (for example, region D) increases, and the activity ratio of an other region (for example, region C) is low, then the region traffic managing system 11 sends three signals such as a signal to the trunk line exchange apparatus 12 through the interface 13 requesting the transmission lines be switched from the region C to the region D, a signal to the region traffic managing system 31 through the interface 31 requesting that the trunk line be closed to the region A, and a signal to the region traffic managing system 42 through the interface 412 of the region D requesting that the transmission line the region A be switched (open) in preparation for the re-distribution.

③ The Third Step

When the request from the region traffic managing system 11 of the region A is approved, a series of processes are performed, that is, closing of the trunk lines 143 and 243 toward the region B, switching of the line switching units 211 by the interface 212, and opening of the trunk lines 143 and 341 toward the region B.

Similarly, each region traffic managing systems 11, 21, 31, and 41 execute switching operations of their dependent trunk line exchange apparatuses 12, 22, 32, and 42, respectively, according to the activity ratio of each region. In the above example, the switching of the transmission lines 244 from the region C to the region D is also executed according to the instruction of the traffic managing system 31 at region B.

As shown above, since the present invention enables executing re-distribution of transmission lines according to the traffic condition at a region, it is possible to cope with busy hour calls without causing congestion, even if the number of the transmission lines for each region is comparatively low.

Figure 3:
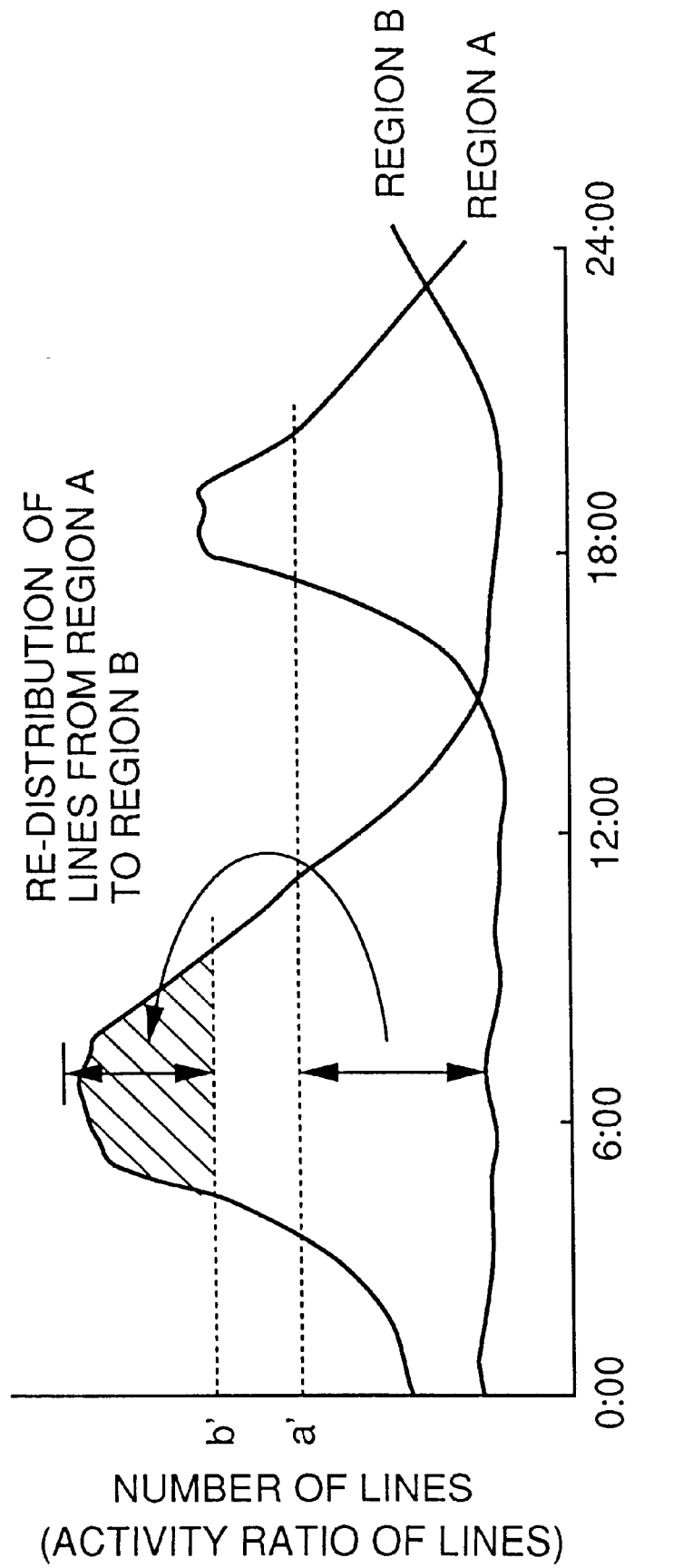
FIG. 3 is a diagram for explaining an example of the line distribution by the trunk line exchange apparatus system of the present invention.

Practically speaking, as shown in FIG. 3, the total number of transmission lines can be reduced to a level of a'+b' which is smaller than a+b, since a shortage of the number of transmission lines for the region B due to busy hours calls (the hatched region in FIG. 3) can be supplemented by the re-distribution of the transmission lines from the region A to the region B.

Moreover, since it is not necessary to conduct a series of processing including recalling/searching for alternative line, that is "an operation to acquire a line to the terminal region, and if the line is busy, an operation is additionally necessary to search and acquire an alternative line", the whole trunk line exchange system can be efficiently utilized and preferably congestion is preferably avoided.

According to the present invention, it was realized to operate the system in very efficient operation of the system is realized and the system can be operated without falling into congestion by the re-distribution of the number of lines available for each region, while the re-distribution is conducted by switching of the line switching units disposed in the front position of the trunk line exchanging means.

What is claimed is:

1. A trunk line exchanging system comprising:

line switches disposed at a front position of a trunk line exchanging system comprising a plurality of trunk lines for servicing a region, said line switches facing another trunk line exchange system, wherein the number of trunk lines for a region is varied by executing a re-distribution operation of trunk lines to cope with variation of traffic at each region by controlling opening and closing of said line switches to redistribute trunk line connections from lower traffic regions to higher traffic regions;

traffic managing means for managing the traffic of each region;

trunk line exchange means installed at each region for executing region trunk line exchanging; and interface means connected with both said trunk line exchange means and said traffic managing means for receiving and sending signals for controlling at least one of activity ratio of each region, trunk line closing, and trunk line switching;

wherein the number of trunk lines to be allocated to each region is re-distributed based on the activity ratio generated by said trunk line exchange means located at each region.

2. A trunk line exchanging system according to claim 1, wherein said traffic managing means comprises:

line switching means for switching said trunk lines;

exchange interface means for receiving the activity ratio of each region through each of said interface means, exchanging signals with said interface means and an opposing region traffic managing means for controlling switching of trunk lines for conducting re-distribution into proper numbers of trunk lines, and, when it is possible to switch the trunk lines, for controlling the switching of the connection.

3. A system for re-distributing trunk lines to accommodate regions experiencing higher volumes of traffic than other regions, each of said regions encompassing a geographical area, said system comprising:

a trunk exchange system servicing each of the plurality of regions;

at least a pair of opposing region traffic managers connected to associated regions by a transmission line;

a multi-core transmission cable connecting said pair of opposing region traffic managers, said opposing region traffic managers comprising:

an exchange interface connected to said trunk exchange system for monitoring traffic; and a line switch connected to said multi-core transmission cable for re-distributing trunk lines in said multi-core transmission cable to accommodate regions experiencing higher volumes of traffic than other regions.

4. A system for redistributing trunk lines to accommodate regions experiencing higher volumes of traffic than other regions as recited in claim 3, wherein said line switch is switched during preset a busy hour zone.

* * * * *